Jan. 9, 1923.                                                                                        1,441,235
H. R. MALSBARY.
SPLIT RIM LOCK AND RELEASE.
FILED APR. 16, 1921.
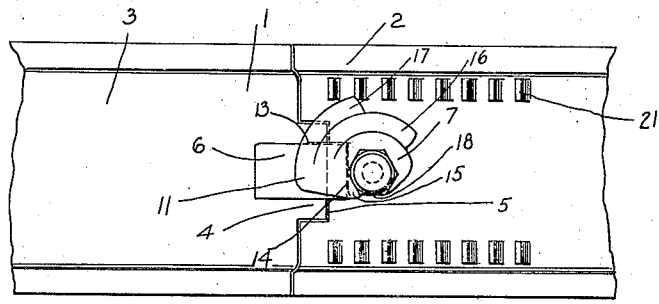
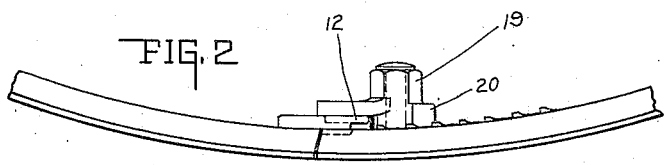
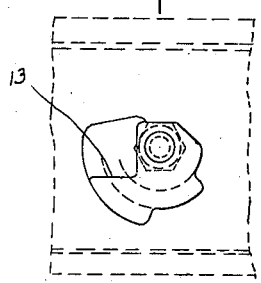
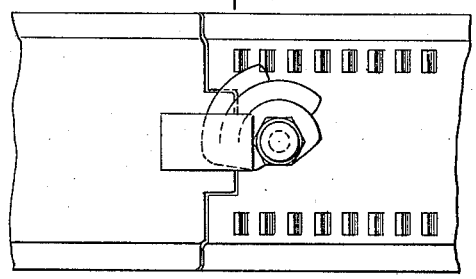
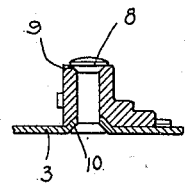
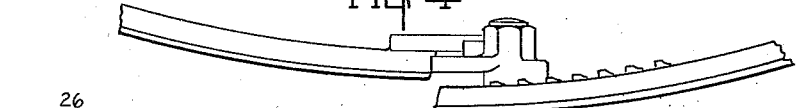
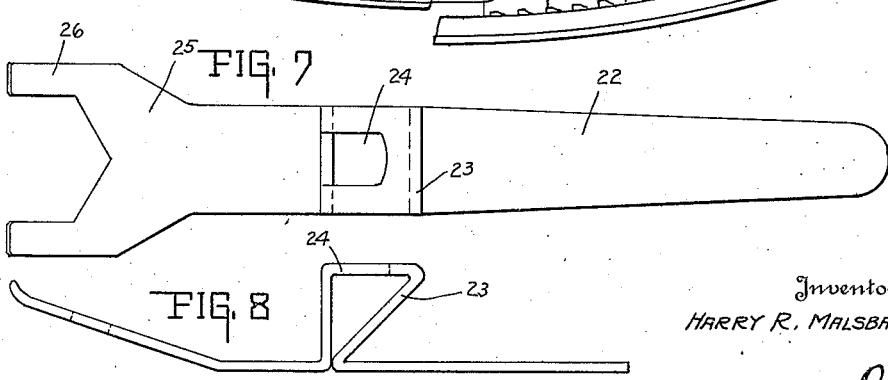
Inventor
HARRY R. MALSBARY
By
Attorney Patented Jan. 9, 1923.

1,441,235

UNITED STATES PATENT OFFICE.

HARRY R. MALSBARY, OF FRANKFORT, INDIANA, ASSIGNOR OF ONE-HALF TO FRED S. THOMAS, OF FRANKFORT, INDIANA.

SPLIT-RIM LOCK AND RELEASE.

Application filed April 16, 1921. Serial No. 461,774.

*To all whom it may concern:*

Be it known that I, HARRY R. MALSBARY, a citizen of the United States, residing at Frankfort, in the county of Clinton and State of Indiana, have invented certain new and useful Improvements in Split-Rim Locks and Releases, of which the following is a specification.

This invention relates to a combined split rim lock and release therefor, one feature of the invention being the provision of a rotating locking mechanism for holding the ends of a split rim together, said lock and parts of the rim having interlocking parts which hold the lock against casual operation.

A further feature of the invention is in so constructing the interlocking parts of the lock and rim that an endwise movement will be imparted to one end of the split rim as the locking mechanism is operated for releasing the end of the split rim.

A further feature of the invention is the provision of means on the locking mechanism for elevating one end of the split rim and releasing it from the opposite end of the split rim when the locking mechanism is rotated, said releasing mechanism being so constructed that when the locking mechanism is being turned to locked position endwise movement will be imparted to one end of the rim.

Other objects and advantages will be hereinafter more fully set forth and pointed out in the accompanying specification.

In the accompanying drawings,

Figure 1 is a top plan view of a pair of split rim ends for automobile wheels showing the same in locked position, Figure 2 is an edge elevation thereof, Figure 3 is a view similar to Figure 1 with the locking mechanism operated to elevate one end of the split rim, Figure 4 is an edge elevation thereof, Figure 5 is a bottom plan view of the combined locking and releasing member removed from the rim, Figure 6 is a sectional view through the rim and locking mechanism, Figure 7 is a plan view of a combined wrench and tire tool, and Figure 8 is an edge elevation thereof with parts broken away.

Referring to the drawings, 1 and 2 indicate the meeting ends of a split rim 3, such as is used for mounting tires upon a vehicle wheel, the end 1 having a tongue 4 which projects into a notch 5 in the end 2, said tongue resisting lateral movement of the end 2 with respect to the end 1. Mounted over the inner face of the tongue 4 and projecting a distance beyond the free edge thereof, is a plate 6, the free end of which overlaps the end 2, and in order to securely lock the two ends of the rim together a locking member 7 is pivoted to the inner face of the end 2 and in position to overlap the plate 6 when the member is turned to locking position. A rivet 8 passes through the body of the locking member and has its ends upset and fitted in counter sunk openings 9 and 10 in the locking member and rim 3. The locking member 7 is provided with a cam portion 11 in the under face of which is formed a recess 12 thereby constituting a wall 13 which limits the swinging movement of the locking member in one direction, and a shoulder 14 against which the end of the plate 6 abuts when the locking member is in locking position. The outer end of the shoulder 14 is curved, as shown at 15, so that the locking member can be readily rotated when moved to unlocked position; however, said curved portion is so arranged that the end 1 will be loosened and moved away from the end 2 as the locking member 7 is being turned to its unlocking position.

The outer face of the cam portion 11 is also provided with spirally arranged inclined faces 16 and 17 which being wedge-shape, and in stepped relation with each other, will successively pass below the projecting end plate 6 and the tongue 4, said parts riding up the inclined faces and moving the end 1 out of registration with the end 2 of the rim when the locking member is rotated to unlocked position. In moving the locking member to unlocked position it is rotated until the flat face 18 thereof registers with the end of the plate 6, after which a tool or other instrument is entered between the ends 1 and 2, and the end 1 lifted so that it will pass over the top of the locking member, consequently so collapsing the rim that a tire may be readily removed therefrom or introduced thereover. The body of the locking member, particularly that portion immediately around the rivet is extended upwardly a distance and provided with a flattened surface to form a nut 19 so that a wrench or other tool may be readily applied thereto for moving the locking member to locked or unlocked position. The locking member 7 at a point substantially diametrically opposite the recess 12 is provided with a curved shoulder 20 which acts as a cam for forcing the end into position to register with the end 2 when said end 1 is forced outwardly.

When the rim 3 is fully collapsed the end 1 projects a distance inwardly past the locking member and when a new tire is placed around the rim said end must be forced back to position, and to more readily accomplish this result the face of the rim adjacent the end 2 is provided with a plurality of serrations or ribs 21 so that by entering the end of a tool below the collapsed end 1 and giving a prying action thereto the end of the tool will engage with the serrations and prevent slipping action of the tool. Any suitable tool or instrument may be provided for operating the locking member 7 and for prying on the end 1 of the rim, but a preferred form of device is shown in Figures 7 and 8, which comprises a combined prying tool and wrench consisting of an elongated handle portion 22 having in its length a bent-up portion 23 for forming a socket, the closed end of the bent-up portion having a slot 24 cut therein, said slot extending into the closed end and one vertical wall and by entering the nut 19 in the slot the tool may be used as a wrench. One end of the tool is provided with a head 25 which is bifurcated at its free end to form arms 26, the head portion and arms being bent out of alignment with the remainder of the handle portion, as best shown in Figure 8, and serves a double purpose, that of lifting the end 1 of the rim above the locking member 7 and the nut 19 thereon, and as a pry for returning the end 1 to its initial position.

In releasing the locking mechanism the tool is placed over the locking member 7 and the nut 19 thereon entered in the slot 24 after which the tool is operated as a wrench and the locking member rotated. As the locking member is rotated to lift the end 1 of the rim the shoulder 20 comes in contact with the end of the plate 6 and forces the ends 1 and 2 apart sufficiently to break connections between the two and as the face 16 comes in contact with the projecting end of the plate 6, said plate will ride up said face and thereby elevate the end 1. As the locking member 7 continues to rotate the inclined face 17 passes below the tongue 4, consequently said tongue will ride up the inclined face 17 and elevate the end 1 of the rim a distance above the end 2, as shown in Figure 4. The tool is then removed from the nut 19 and the arms 26 thereof introduced below the end 1 on opposite sides of the locking member, the head portion 25 then resting above the nut 19. The outer end of the handle member 22 is then lowered, which in view of the fact that the head 25 is fulcruming on the nut portion of the locking member 7, will raise the end 1 to a plane above the locking member when the rim can be fully collapsed.

In returning the end 1 to its initial position the arms 26 are entered below or placed against the end 1 and a prying action given to the tool, and as the ends of the arms will engage the serrations 21 the tool will be held against slipping, consequently the force applied will readily expand the rim to its initial operative position.

It will be understood, of course, that at the time of raising or lowering the end 1 from engagement with the end 2 the locking member 7 is turned until the flat face 18 registers with the end of the plate 6 and after the rim has been expanded and the end 1 forced downwardly into registration with the end 2 the tool is again applied to the nut 19 and the locking member 7 turned in the opposite direction, thereby disposing the cam portion over the plate 6, the movement of the locking member 7 continuing until the wall 13 strikes the edge of the plate 6. As the shoulder 14 and end of the plate 6 are both flat or extend substantially in a straight line, the locking member will be securely locked against casual operation owing to the fact that it is necessary to exert a slight endwise movement to the end 1 in releasing the locking member from the plate 6.

Having thus fully described my said invention, what I claim as new and desire to secure by Letters Patent, is:

1. The combination with the meeting ends of a split rim, of a revolving locking member carried by one of said ends and engaging parts of the opposite end for holding the same in locking position, and stepped on the locking member for releasing and elevating one of said ends when the locking member is rotated in one direction.

2. The combination with the meeting ends of a split rim, of a revolving locking member rotatably secured to one of said ends, a plate secured to the opposite end, and stepped on the locking member for engaging said plate and elevating the end of the rim to which the plate is attached when the locking member is rotated in one direction.

3. The combination with the meeting ends of a split rim, one of said ends having a tongue and a plate mounted thereon, and the opposite end having a notch for the reception of said tongue, of a locking member rotatably mounted upon the end having the notch, means on the locking member for imparting endwise movement to the ends of the rim when rotated, and additional means on the locking member for engaging successively said plate and tongue for elevating the end of the rim having said tongue and plate to a plane above the opposite end.

4. A combined locking member and release for the ends of a split rim, comprising a rotating member, a cam portion for interlocking with one of the ends of the rim, and inclined portions adapted to engage and elevate one of the ends of the rim when the locking member is rotated.

5. A combined locking and releasing member for the ends of a split rim, comprising a rotatably mounted member having a cam portion in the under face of which is formed a recess for engagement with one of the ends of the rim, means on the locking member for imparting endwise movement to the ends of the rim when the locking member is rotated, and inclined surfaces for successive engagement with one of the ends for elevating said end when the locking member is rotated.

In witness whereof, I have hereunto set my hand and seal at Indianapolis, Indiana, this 12th day of April, A. D. nineteen hundred and twenty-one.

HARRY R. MALSBARY. [L. S.]

Witnesses:
 CAREY S. FRYE,
 FRED S. THOMAS.